(12) United States Patent
Singh et al.

(10) Patent No.: US 10,490,183 B2
(45) Date of Patent: Nov. 26, 2019

(54) FULLY MANAGED AND CONTINUOUSLY TRAINED AUTOMATIC SPEECH RECOGNITION SERVICE

(71) Applicant: Amazon Technologies, Inc., Seattle, WA (US)

(72) Inventors: Ashish Singh, Bothell, WA (US); Deepikaa Suresh, Seattle, WA (US); Vasanth Philomin, Seattle, WA (US); Rajkumar Gulabani, Sammamish, WA (US); Vladimir Zhukov, Seattle, WA (US); Swaminathan Sivasubramanian, Sammamish, WA (US); Vikram Sathyanarayana Anbazhagan, Issaquah, WA (US); Praveen Kumar Akarapu, Redmond, WA (US); Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/922,495

(22) Filed: Mar. 15, 2018

(65) Prior Publication Data

US 2019/0156816 A1 May 23, 2019

Related U.S. Application Data

(60) Provisional application No. 62/590,188, filed on Nov. 22, 2017.

(51) Int. Cl.
*G10L 15/06* (2013.01)
*G10L 15/26* (2006.01)
(Continued)

(52) U.S. Cl.
CPC ......... *G10L 15/063* (2013.01); *G06F 16/683* (2019.01); *G10L 15/16* (2013.01);
(Continued)

(58) Field of Classification Search
CPC ..... G10L 15/063; G10L 16/683; G10L 15/16; G10L 15/18; G10L 15/26; G10L 2015/088
(Continued)

(56) References Cited

U.S. PATENT DOCUMENTS 6,263,308 B1    7/2001   Heckerman et al.
6,321,307 B1 * 11/2001   Maguire ............. G06F 12/0835
                                                   711/146

(Continued)

OTHER PUBLICATIONS

International Search Report and Written Opinion issued in related International Patent Application No. PCT/US2018/061591, dated Feb. 5, 2019, 12 pages.

*Primary Examiner* — Quynh H Nguyen
(74) *Attorney, Agent, or Firm* — Nicholson De Vos Webster & Elliott LLP

(57) ABSTRACT

Techniques for automated speech recognition (ASR) are described. A user can upload an audio file to a storage location. The user then provides the ASR service with a reference to the audio file. An ASR engine analyzes the audio file, using an acoustic model to divide the audio data into words, and a language model to identify the words spoken in the audio file. The acoustic model can be trained using audio sentence data, enabling the transcription service to accurately transcribe lengthy audio data. The results are punctuated and normalized, and the resulting transcript is returned to the user.

18 Claims, 9 Drawing Sheets

(51) Int. Cl.
  *G10L 15/16*  (2006.01)
  *G10L 15/18*  (2013.01)
  *G06F 16/683* (2019.01)
  *G10L 15/30*  (2013.01)
  *G10L 15/08*  (2006.01)
  *G10L 15/187* (2013.01)
  *G10L 15/183* (2013.01)

(52) U.S. Cl.
  CPC .............. *G10L 15/18* (2013.01); *G10L 15/26* (2013.01); *G10L 15/30* (2013.01); *G10L 15/183* (2013.01); *G10L 15/187* (2013.01); *G10L 2015/088* (2013.01)

(58) Field of Classification Search
  USPC ........................................................ 704/231
  See application file for complete search history.

(56) References Cited

U.S. PATENT DOCUMENTS

| | | | |
|---|---|---|---|
| 8,996,372 B1 | 3/2015 | Secker-Walker et al. | |
| 2004/0010582 A1* | 1/2004 | Oliver | H04M 3/493 709/224 |
| 2012/0059652 A1 | 3/2012 | Adams et al. | |
| 2016/0093294 A1 | 3/2016 | Kapralova et al. | |
| 2016/0197777 A1* | 7/2016 | Tarantino | H04L 41/5054 370/254 |

\* cited by examiner

US 10,490,183 B2

FULLY MANAGED AND CONTINUOUSLY TRAINED AUTOMATIC SPEECH RECOGNITION SERVICE

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for automatic speech recognition (ASR) are described. Embodiments provide a fully managed and continuously trained ASR service that takes in sound files and automatically generates transcripts of the speech they include. According to some embodiments, a user can upload an audio file (e.g., telephonic quality or higher) to a storage location. The user then provides an ASR service with a reference to the audio file. An ASR engine then analyzes the audio file, using an acoustic model to divide the audio data into words, and a language model to identify the words spoken in the audio file. The acoustic model can be trained using two minute or longer audio sentence data, enabling the transcription service to accurately transcribe lengthy audio data. The results are then punctuated and normalized (e.g., determine whether "eleven fifteen" should be represented as 11:15, 11/15, eleven fifteen, etc. depending on context). The resulting transcript is then returned to the user.

People and organizations are storing more and more data in audio and video files which they would like to extract value from. Content stored as audio cannot be practically searched and analyzed, and typical speech recognition tools are inadequate for converting such long form content to text. The service enables organizations to increase the accessibility and discoverability of their audio and video content. ASR can be applied across a breadth of applications. For example, customer contact centers can convert call recordings into text and analyze the data for actionable intelligence; media content producers can automate subtitling workflows for greater reach, while marketers and advertisers can enhance content discovery and display more targeted advertising based on the extracted metadata. For example, transcripts enable search engines to understand video content for search engine optimization, and deliver more relevant ads by using the extracted insights as additional signals to the ad server (such as showing a sports shoe ad is in the middle of a football match vs. a swimming competition).

Most speech recognition systems provide a string of text as an output, without punctuation. This makes the transcription difficult to read; requiring manual reviews or post-processing to add the appropriate punctuation. In some embodiments, punctuation and formatting can be added automatically—substantially increasing the readability and usability of the transcript.

Figure 1:
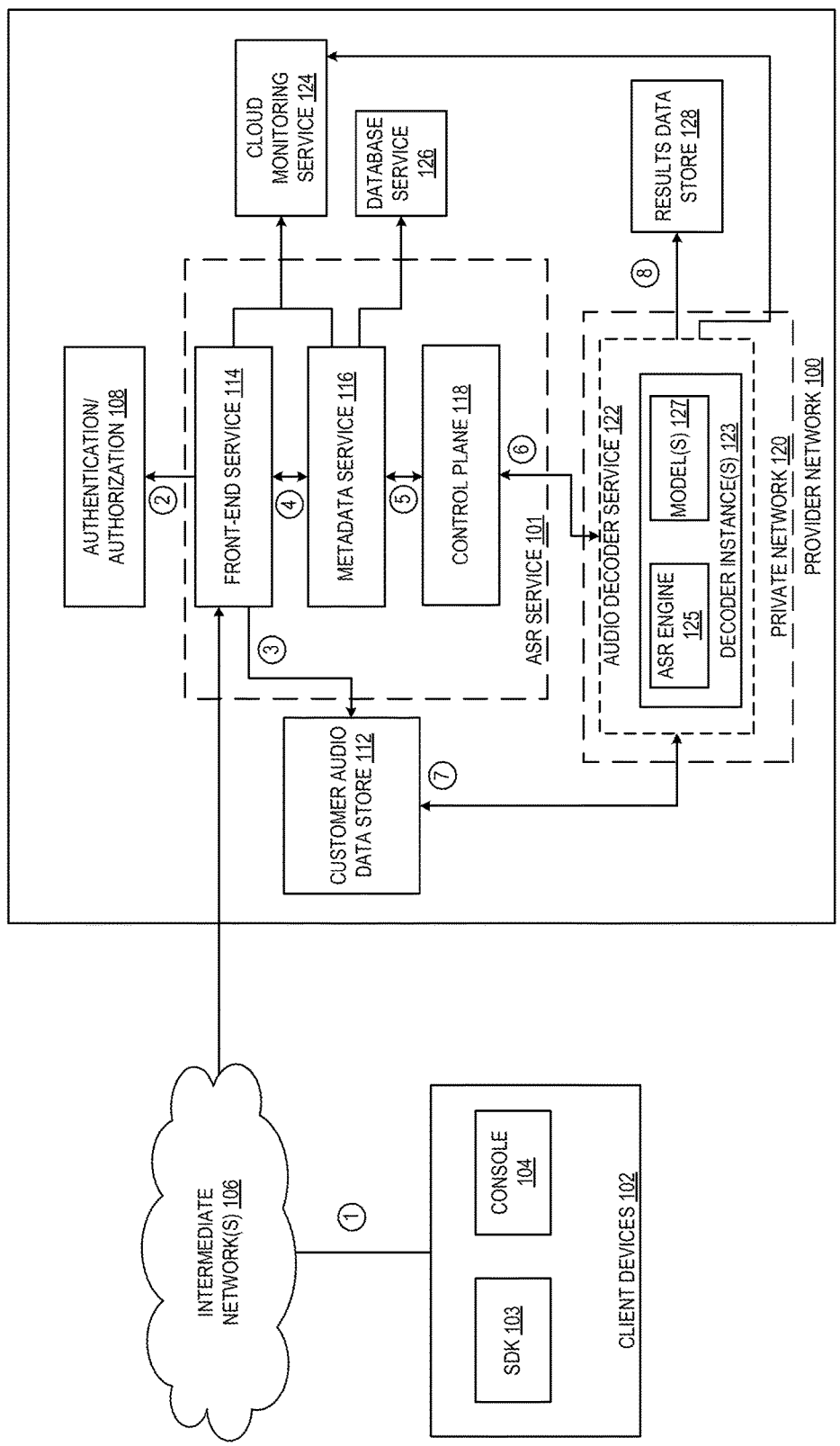
FIG. 1 is a block diagram illustrating an architecture of a managed and continuously trained automatic speech recognition (ASR) service, according to some embodiments.

FIG. 1 is a block diagram illustrating an architecture of a managed and continuously trained automatic speech recognition (ASR) service 101, according to some embodiments. Such an ASR service can be implemented in and/or provided by a provider network 100. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 100 may utilize one or more user accounts that are associated with a customer account, though these terms may be used somewhat interchangeably depend ending upon the context of use. Users may interact with a provider network 100 across one or more intermediate networks 106 (e.g., the internet) via one or more interface(s), such as through use of application programming interface (API) calls, via an application implementing a software development kit (SDK) 103, a console 104 implemented as a website or application, etc. The interface(s) may be part of, or serve as a front-end to, a control plane 118 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As shown in FIG. 1, a front-end Service 114 can receive audio recognition and customized model building requests. As shown at numeral 1, a request from a client device can be sent to front-end service 114 via one or more intermediate networks 106. In some embodiments, the front-end service 114 is responsible for at least one of: authentication and authorization 108; publishing ASR job details such as execution time, pending time, etc., to a call-recording and log-monitoring service; throttling APIs at a configurable rate; communicating with the Metadata Service 116 to submit user requests and returns the status of jobs to the customer; returning transcripts (e.g., a pre-signed virtualized storage service Uniform Resource Locator (URL)) to the users when results are available; and/or providing whitelist functionality. For example, at numeral 2, front-end service 114 can authorize and/or authenticate the request received from client device 102. In some embodiments, the request can include a reference to an audio file stored in customer audio data store 112, which may have been previously uploaded by client devices 102, generated by other entities/services within the provider network 100, etc. Various languages may be supported, including English and Spanish speech-to-text conversion in batch and real-time. An ASR 125 provides accurate transcription for 8 Khz (telephony quality) audio, 16 Khz (HD voice) audio, or better. This allows both high fidelity recordings, as well as lower quality telephony recordings common in call center systems, to be transcribed. In some embodiments, the reference to the audio file may be provided through an API. The reference may be to a single audio file or a batch of audio files stored in customer audio data store 112.

At numeral 3, front-end service 114 can confirm access to the customer audio data store 112 using permissions or other metadata provided in the request. Metadata service 116 encapsulates interactions with a storage layer, e.g., database service 126. At numeral 4, the authenticated and/or authorized request from client device 102 can be passed to metadata service 116. In some embodiments, the metadata service 116 is responsible for at least one of providing functionality to describe/list customer requests; fetching lists of pending jobs and track job status; throttling and caching to ensure that the storage layer is not overwhelmed; and/or maintaining limits for the number of resources, jobs, etc., per account. In some embodiments, metadata service 116 and/or front-end service 114 can output logs to cloud monitoring service 124. The logs may include data such as a job completion time, a number of pending jobs, a number of jobs per account, etc.

Once the metadata service 116 has confirmed that the request can be performed, at numeral 5 the request is passed to the control plane 118. Control plane 118 can perform job orchestration. In some embodiments, control plane 118 may add jobs to a job queue, for example using a queue service. Audio decoder service (ADS) 122 can poll the queue for new jobs at numeral 6. Once a new job is identified (e.g., a message identifying the job is received from the queue), audio decoder service 122 can download the corresponding customer audio file at numeral 7 and validate the audio file (e.g., determining the audio file is of an appropriate format and/or quality and provisioning a decoder instance 123 for audio decoding). Once validation is successful, the customer audio file can be passed to the ASR engine 125, which may be running on the same decoder instance. The audio decoder service can monitor the ASR engine for results (e.g., by polling a directory on the decoder instance to which the output results are stored). In some embodiments, the Control Plane can run in a private network on a hardware virtualization service instance. The ADS account may own the queue through which the control plane sends jobs to the service. A queue publishing role can be created in the ADS account which allows publishing messages to this queue and this role can be granted to the control plane. The control plane may be the only service which interacts with the ADS through the queue using the queue publisher role created in the ADS account.

As discussed further below, to improve isolation of customer data the decoder instance 123 may be provisioned to a private network 120. When decoding is complete, at numeral 8 the resulting transcript may be stored in results data store 128 and marks the job as complete in the metadata service. In some embodiments, the audio decoder service monitor usage for metering purposes and can send a notification to the requestor to indicate job completion. The transcript can be returned which includes a timestamp for each word so that the transcript can be aligned to the audio source file. Timestamping provides the ability to search and index a library of audio and video assets; thus, one can search for a particular word in the speech-to-text transcription and locate it in the original recording.

In some embodiments, during transcription an ASR engine 125 searches through a language model (LM) 127 by incrementally generating hypotheses based on incoming audio data. The set of hypotheses is then reduced and simplified by a process called determinization. Since larger LMs tend to yield more hypotheses, determinization time increases with LM size. In some embodiments, determinization occurs after all audio has been ingested, meaning that it contributes directly to user-perceived latency. In some embodiments, an online determinization algorithm can proceed incrementally along with the search thereby reducing user-perceived latency.

As generating hypotheses by searching through a very large language model may be time consuming, in some embodiments ASR engine 125 can generate hypotheses from a smaller LM first. The ASR engine 125 then re-ranks these against a larger LM with the same vocabulary. For example, the phrases "black see" and "black sea" are both necessarily valid search hypotheses for some audio data. A unigram LM (a language model based on single-word frequencies, say in the English language) would rank "black see" first, since "see" is more common than "sea." However, a larger bigram LM based on frequencies of pairs of words would rank "black sea" first since it is a common phrase.

Typically, for rescoring a smaller LM is used by the ASR engine 125 in the "first pass" search to construct the initial set of hypotheses. These are then rescored using a larger LM to generate the final hypotheses. This rescoring method adds latency for the second pass and it is appropriate for offline dictation use cases but not for messaging. Instead, on-the-fly rescoring can be implemented for messaging. Hypotheses from the smaller LM search are rescored by the larger LM right at the time that the search hypotheses are generated. In addition, since the rescoring model is available during the search itself, pruning of hypotheses can be more effective, which can add lower latency to the decoder.

In some embodiments, the control plane 118 of the ASR service can continually scan a data store for a list of jobs to be performed. When one or more jobs are detected, a workflow can be started to perform the transcription. A new instance including an ASR engine can be started for each job. The ASR engine 125 can convert the audio format of the file (or batch of files) to WAV. In some embodiments, the ASR engine can pass the WAV audio through an acoustic model to break the WAV file into a series of words. In some embodiments, models 127 may include one or more language models and an acoustic model. Some of these series of words may represent sentences, some may not be intelligible. To further refine this output, it can be passed through a LM. The LM includes grammar rules, language constructs, and other language-specific nuances. In some embodiments, the LM can include a custom glossary that includes jargon or other domain specific words or phrases. The LM analyzes the input and determines whether the series of words makes sense in the language of the LM. For example, the output includes a plurality of hypotheses associated with each resulting sentence (or series of words). The hypotheses include a confidence value indicating how likely the ASR engine 125 believes the sentence to be correctly transcribed. In some embodiments, when the audio file includes multiple speakers, each speaker's portion can be tagged with the speaker. Each speaker's tagged audio can then be processed by speech-to-text engine, and then the result is punctuated and normalized. Normalization may include determine the formatting of language (e.g., determine whether "eleven fifteen" should be represented as 11:15, 11/15, eleven fifteen, etc. depending on context).

In some embodiments, the acoustic model can be trained using longer sentences (e.g., two minutes or longer sentences). In some embodiments, the acoustic model may be a long-short term memory (LSTM) neural network, though in other embodiments other machine learning models (e.g., neural networks such as recurrent neural networks (RNNs)) may be used. Audio input can be segmented into two-minute chunks which may extend past two minutes until a first silence is detected. In some embodiments, training may be performed continuously. In such embodiments, transcription performance can be compared against the audio processed previously (e.g., in a past day or other prior time period) to identify any gaps in accuracy as a function of genres, acoustic properties, customer etc. Data may then be selected from a corpus of audio data (e.g., existing data sets and data captured from customers), and used to train the acoustic model to improve accuracy. The training loop may be performed continuously, daily, weekly, or according to another schedule to maintain accuracy of the acoustic model.

As described herein, neural networks may be utilized in some embodiments. A neural network may include multiple of layers of nodes, including hidden layers. A hidden layer may include nodes that are linked with incoming and outgoing connections. These connections may be weighted. Data can be passed through these layers to generate an output of the neural network. Neural networks can learn as data is provided to them, adjusting the weights associated with the various connections each time new data is presented. Training the acoustic model based on a training dataset may be performed iteratively. The neural network adjusts the weights to identify the correct words spoken in input audio samples. In some embodiments, training may include supervised and/or unsupervised training phases. As training data is passed through the base model, words spoken in the training data are classified. During supervised training, feedback on whether the words have been correctly identified can be received from one or more computing devices or services.

In some embodiments, the correct classifications can be compared to the output of the neural network's final layer. Based on this comparison, differences between the output and the correct classifications can be back-propagated to previous layers of the neural network. This feedback can be modified based on a transfer function associated with the neural network and/or between these layers (e.g., using the derivative of the transfer function) and used to modify the weights associated with the connections. In some embodiments, a delta rule, such as a gradient descent learning rule, can be used to for updating the weights of the inputs to artificial neurons in a neural network. In some embodiments, training may use one or more machine learning libraries.

During training of a neural network, one or more parameters (sometimes referred to as "hyperparameters") may be set, such as by a user or machine learning process. These hyperparameters may include hidden units, learning rate, momentum, weight, maximum norm, batch size, maximum tries, maximum iterations, etc. By adjusting these parameters, the amount of change to the neural network from feedback (e.g., changes to weights for the connections) can be increased or decreased. This may affect both how quickly the neural network learns the training material and how accurately the neural network performs. For example, momentum adds part of the previous weight to the current weight of a given connection. By adjusting the momentum, the neural network can avoid settling in a local minimum during training or missing the minimum during training.

Figure 2:
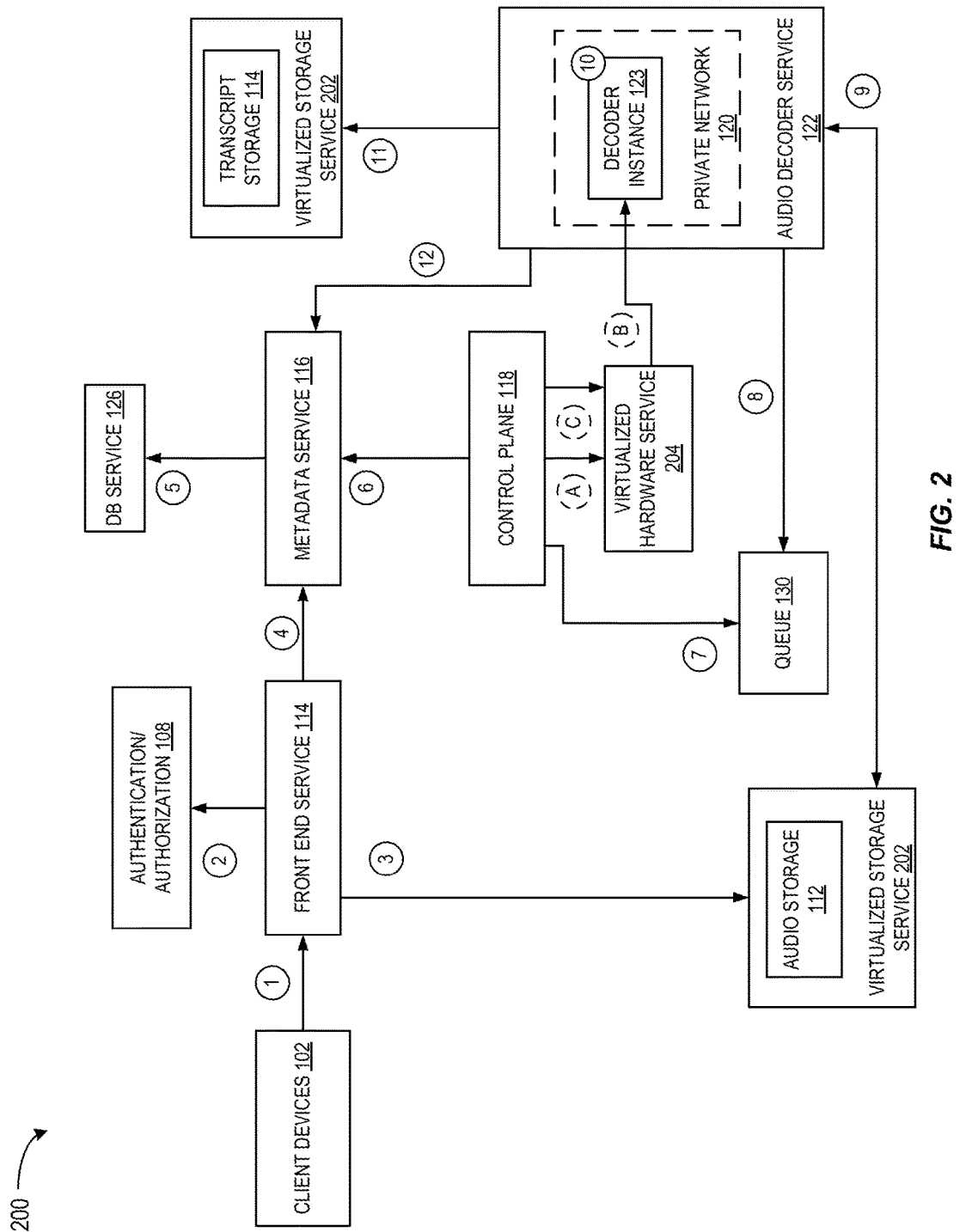
FIG. 2 is a block diagram illustrating a data flow of a managed and continuously trained ASR service, according to some embodiments.

FIG. 2 is a block diagram 200 illustrating a data flow of a managed and continuously trained automatic speech recognition (ASR) service, according to some embodiments. As shown in FIG. 2, at numeral 1 a customer submits a job with an audio location and metadata to the Front-end Service 114. The front-end service supports HyperText Transfer Protocol (HTTP) Secure (HTTPS) protocol and uses a load balancer to distribute requests to the fleet. In some embodiments, the front-end service (FES) 114 then performs one or more of the following checks: at numeral 2 it authorizes the request with an authorization service 108, checks if the account has been white listed for access to the service, and/or checks if the number of pending requests for the customer does not exceed the threshold. In some embodiments, at numeral 3, the front-end service 114 then checks if the customer has given all required permissions by requesting metadata of the referenced audio file specified by the customer/user. In some embodiments, the audio file reference may include a link to the audio file in audio storage 112. In some embodiments, audio storage 112 may be provided in a virtualized storage service 202.

At numeral 4, once the request has been verified, it calls the metadata service ("MDS") 116 to record request metadata. In some embodiments, MDS 116 is a service hosted by an API Gateway and an event-driven compute service. It publishes a role which is assumed by FES 114 for making the API call. This role may define the FES 114 as a trusted entity. In some embodiments, the API Gateway does not forward the role from one entity to another and hence this enables cross-account API calls. In some embodiments, the API gateway supports multiple roles assigned to multiple entities, and authentication is performed using the event-driven compute service. In some embodiments, MDS only exposes HTTPS endpoints (e.g., the API gateway only provides public endpoints). At numeral 5, the MDS stores this request metadata in a database service table over HTTPS connection.

At numeral 6, the control plane (or control plane service ("CPS")) 118 utilizes a sweeper which polls MDS 116 to fetch a list of pending jobs in the MDS metadata. It can use a role published by MDS to make these API calls similar to FES. In some embodiments, MDS returns a job identifier which is used by CPS for idempotency.

At numeral 7, the sweeper can send a message to a predefined queue 130 which the AudioDecoderService (ADS) 122 is polling at numeral 8. The ADS 122 can receive the message corresponding to an enqueued job and download the corresponding customer audio file from virtualized storage service 202 at numeral 9. The customer audio file can then be stored to a storage location, such as an encrypted volume in ADS and or a storage location in virtualized storage service 202. In some embodiments, ADS can create a backup of the customer audio file in the virtualized storage service. As shown, in some embodiments, audio decoder service runs in a private network 120 on one or more decoder instances 123.

Once downloaded, at numeral 10, ADS 122 can check if the audio file is valid using a decoder, such as FFMPEG. If validation fails then the request can be marked failed and the decoding job terminated. The decoder and any associated libraries can be installed on the decoder instance 123. If validation succeeds, we submit the file to the ASR engine on decoder instance 123. This can include moving the validated audio file(s) from the storage location to which is was downloaded, a validation directory, or any other storage location to an input directory associated with the ASR engine. The final step of the workflow is to poll and check if the job is complete. This is done by monitoring an output directory where the ASR engine writes results. In some embodiments, if the host goes down during submission or polling, we will start execution from the beginning (with some max limit on number of attempts).

Once the results are available, at numeral 11, ADS 122 can upload the results to transcript storage 114 in virtualized storage service 202, e.g., over a secure HTTPS channel. This result file includes the transcript of the audio file submitted by the customer. At 12, the ADS 122 can call the MDS to mark the job as completed. Additionally, in some embodiments, the ADS 122 can delete all customer files (including customer audio files) and any other files associated with transcribing the customer audio file from the decoder instance 123 once the job is complete. In some embodiments, after the transcription process is complete, all processes in the ADS can be shut down except for a monitoring process. The monitoring process continues to scan the "in" directory and can then begin a new transcription job (e.g., start all appropriate processes as discussed above) after it receives an input in the input directory. During process shutdown, ASR also cleans up any temporary artifacts to make sure that no data from the previous transcription job is left behind.

As shown in FIG. 2, in some embodiments, a new decoder instance can be created for each transcription job. At A, the first step is to provision a hardware virtualization service 204 instance in the private subnet 120 of an audio decoder service 122. In some embodiments, this may be provisioned using a keypair which was created during stack setup. The SDK can be used to invoke hardware virtualization service APIs. In some embodiments, key files can be stored to SCP and run remote commands. The keys can be generated using a hardware virtualization service "createKeyPair" API as part of stack set up, and the private key generated can be stored in a material set and rotated periodically. At B, the provisioned decoder instance 123 can have the language model and acoustic model deployed thereto. The ASR engine and a codec (e.g., FFMPEG) can be deployed to this instance 123. Each time a new job is started, a dedicated instance may be provisioned and taken down following the completion of the job. By using a dedicated instance, embodiments ensure that even if there is a bug in third party software, one customer's data is not leaked to another. At C, once the transcript is uploaded to the transcript storage location 114, the hardware virtualization service decoder instance 123 which was used for running the decoder can be terminated. In some embodiments, the file is deleted from the instance. If instance termination fails, an alarm can be set to detect this and take manual action.

In some embodiments, rather than deploying an instance for each job, the service may be containerized. A container can then be deployed for each job. Containers provide a lightweight package (e.g., an image file) that includes various resources for an application to run. For example, a container may include configuration settings, network settings, registries, files, etc. (e.g., collectively "dependencies") used by the application in regular operation, isolating the application from the underlying system on which it is running Multiple containers may run on a same host machine and share the underlying O/S across them, and in some embodiments, may also share those dependencies that are used by multiple applications. Because an application in a container is isolated from the underlying O/S, to create a container from an existing application, that application's dependencies (e.g., the files, registries, configuration and network settings, etc.) need to be known or discoverable. For example, when a new job is started, the control plane 118 can instruct a container service to allocate a container running a decoder application to one or more compute instances in provider network 100 (e.g., one or more VMs provided by hardware virtualization service 204). The decoder application may be a containerized version of the application or applications deployed to each decoder instance, as described above. When the job is completed, the container may be removed.

Figure 3:
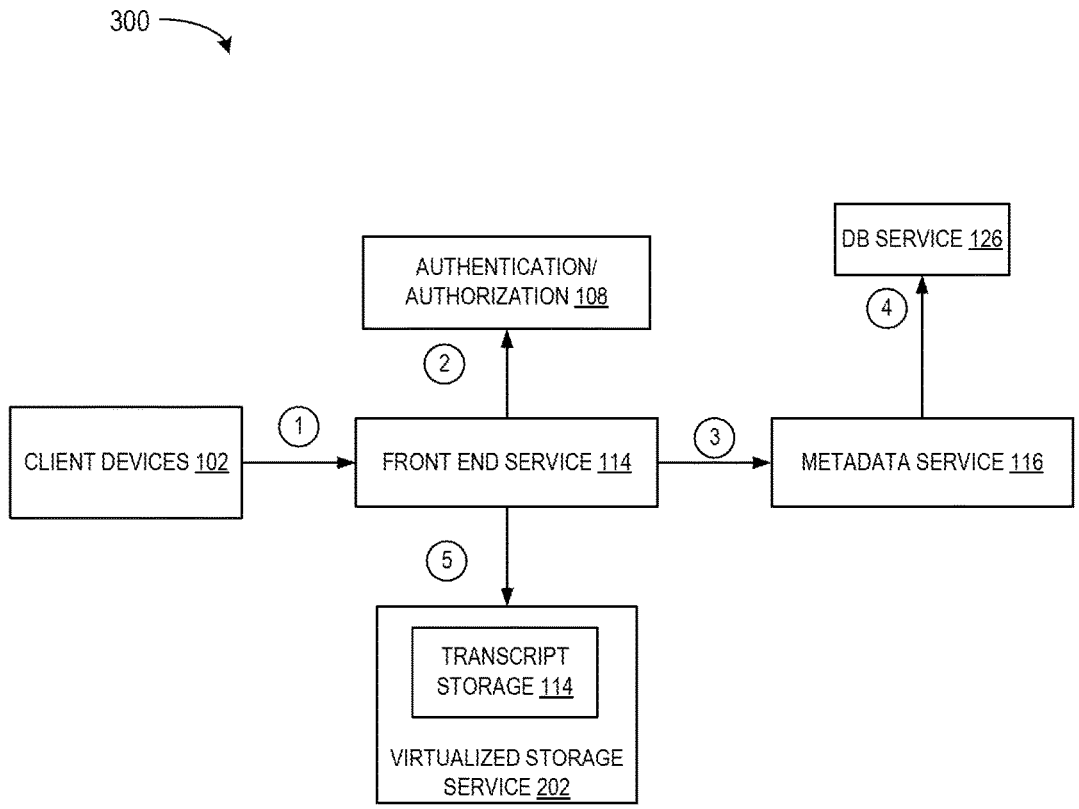
FIG. 3 is a block diagram illustrating a data flow of a managed and continuously trained ASR service, according to some embodiments.

FIG. 3 is a block diagram 300 illustrating a data flow of a managed and continuously trained ASR service, according to some embodiments. As shown at numeral 1, the user can request the result of the ASR service discussed above with respect to FIG. 2. The front-end service 114 can look up an identity for the requesting account at numeral 2 to authorize the user. At numeral 3, the front-end service can retrieve job details from the metadata service 116. At numeral 4, the job details can be retrieved from a database service. At numeral 5 a presigned URL for the result transcript can be generated in transcript storage 114.

Figure 4:
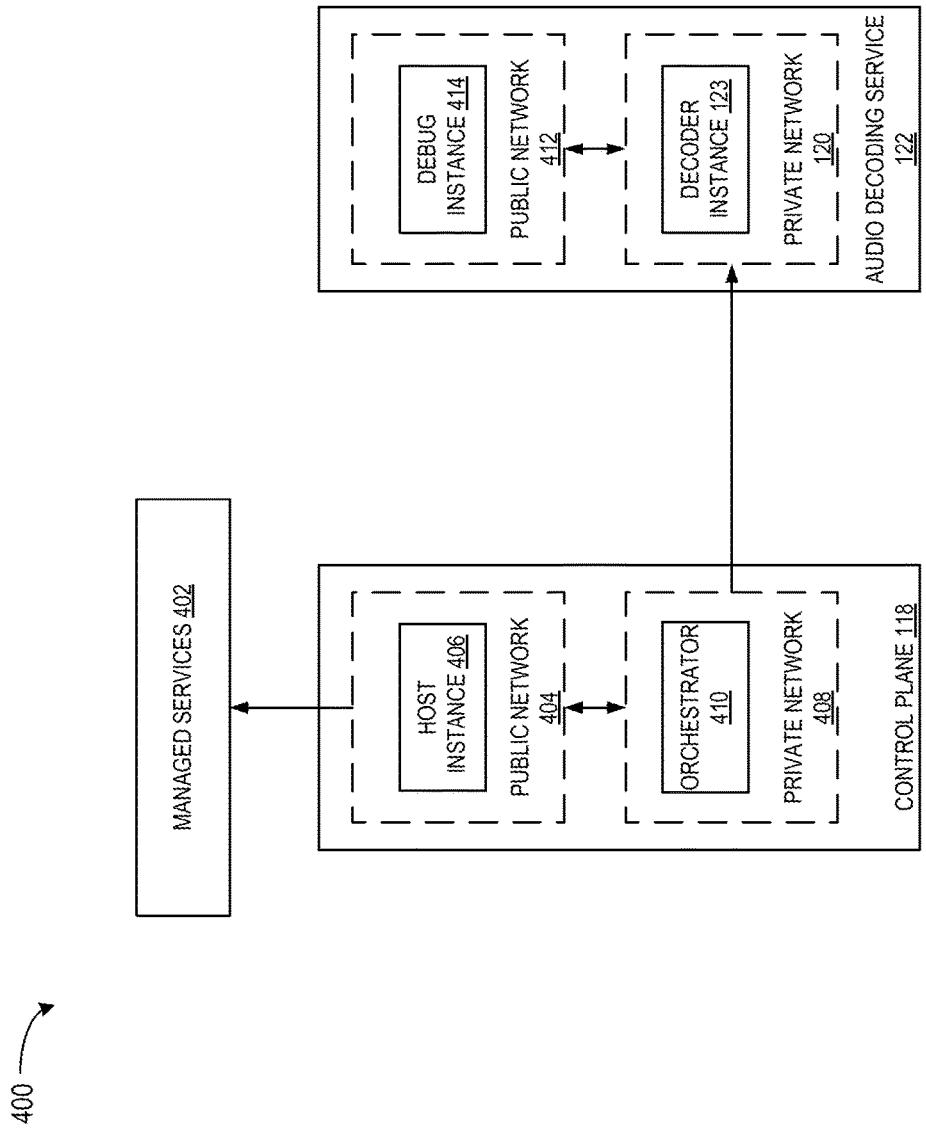
FIG. 4 is a block diagram illustrating a control plane and decoder of a managed and continuously trained ASR service, according to some embodiments.

FIG. 4 is a block diagram 400 illustrating a control plane and decoder environment of a managed and continuously trained ASR service, according to some embodiments. As discussed, virtualized storage services, workflow services, virtualized hardware services, database services, and other managed services 402 shown in FIG. 4, may be used by the ASR service. To improve customer data isolation, control plane 118 can include a public network 404 and one or more host instances 406 which have access to the managed services 402. The control plane may also include a private network 408 including an orchestrator 410. Third party software can be deployed to decoder instances 123 in a separate private network 120 in a private subnet in audio decoder service 122. In some embodiments, the decoder instances 123 on the private subnet do not have any outbound access and may only allow inbound connections fully controlled by the Control Plane 118 from orchestrator 410. The decoder instances 123 do not have permission to communicate with each other. Also, a single decoder instance is responsible for a single job. In some embodiments, permissions (e.g., SSH) allow pushing the customer audio data to a decoder instance provisioned for this job in the private network 120 and to allow fetching results from the decoder instance. In some embodiments, audio decoder service 122 may also include a public network 412 including one or more debug instances which enable developers to debug the decoder instances 123.

In some embodiments, a custom machine image may be used to launch decoder instances 123. An isolated environment (e.g., a sandbox) may be created in which the customer submitted audio files are validated and decoded. The default sandbox domain may restrict applications to the ability to read and write file descriptors which are specifically passed to the applications (e.g., the applications may be restricted from opening or otherwise accessing other files). Policies may also be created which define limited permissions to restrict applications in the sandbox to executing a decoder and/or accessing specific decoder libraries (e.g., FFMPEG and associated libraries).

Figure 5:
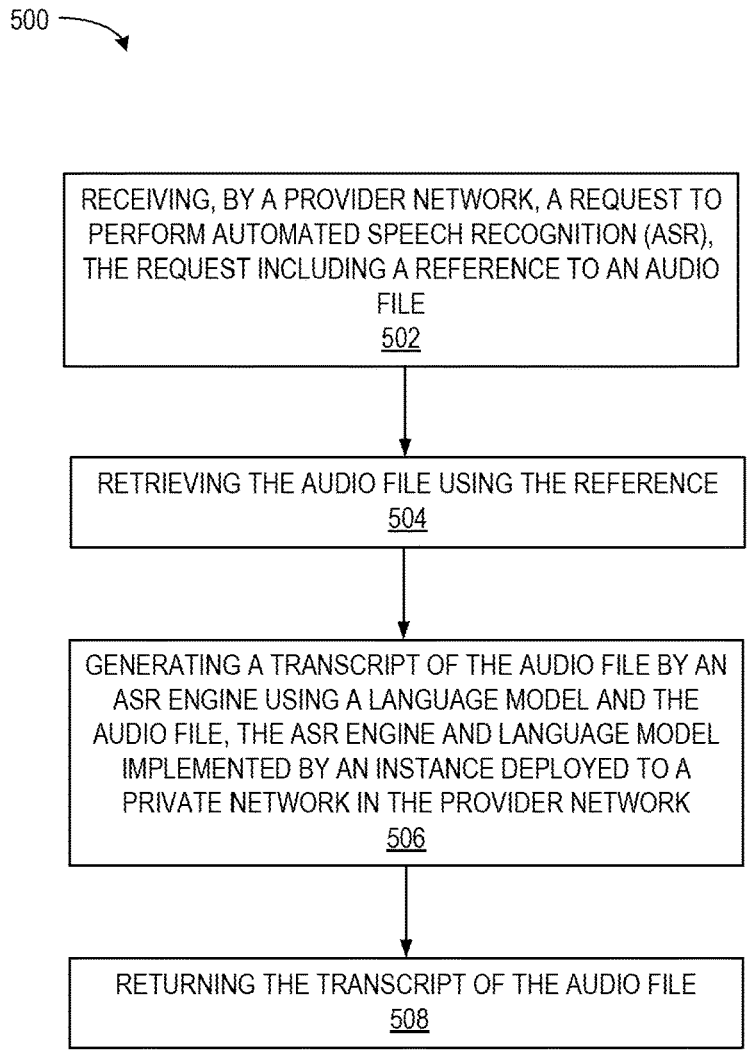
FIG. 5 is a flow diagram illustrating operations for automatic speech recognition according to some embodiments.

FIG. 5 is a flow diagram illustrating operations 500 (e.g., of a method) for automatic speech recognition according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the front-end service 114, metadata service 116, and/or control plane 118 of the other figures.

The operations 500 include, at block 502, receiving, by a provider network, a request to perform automated speech recognition (ASR), the request including a reference to an audio file. At block 504, retrieving the audio file using the reference. In some embodiments, the request can be authorized with an authorization service to determine whether a number of pending requests associated with an account associated with the request does not exceed a threshold.

At block 506, generating a transcript of the audio file by an ASR engine using a language model and the audio file, the ASR engine and language model implemented by an instance deployed to a private network in the provider network. In some embodiments, the audio file can be divided into a plurality of words using an acoustic model. The acoustic model can be trained using previously processed audio data to identify inaccuracies in the acoustic model as a function of one or more of genres, acoustic properties, or customer-specific language. In some embodiments, the language model is one of a plurality of language models selected based on metadata received with the request.

In some embodiments, the request can be sent to a control plane, the control plane orchestrating a plurality of requests. The control plane can execute a workflow to perform ASR on the request. In some embodiments, the control plane can poll queued jobs (e.g., pending requests) to perform ASR on new jobs. In some embodiments, a separate decoder instance can be provisioned for each request. For example, a decoder instance can be provisioned to generate the transcript of the audio file. Once the transcript is determined to be complete, the decoder instance can be deprovisioned. In some embodiments, the decoder instance is implemented as a container deployed in the private network.

At block 508, returning the transcript of the audio file. In some embodiments, block 508 can include uploading the transcript to a storage service provider, and returning a reference to the transcript in the storage service provider.

Figure 6:
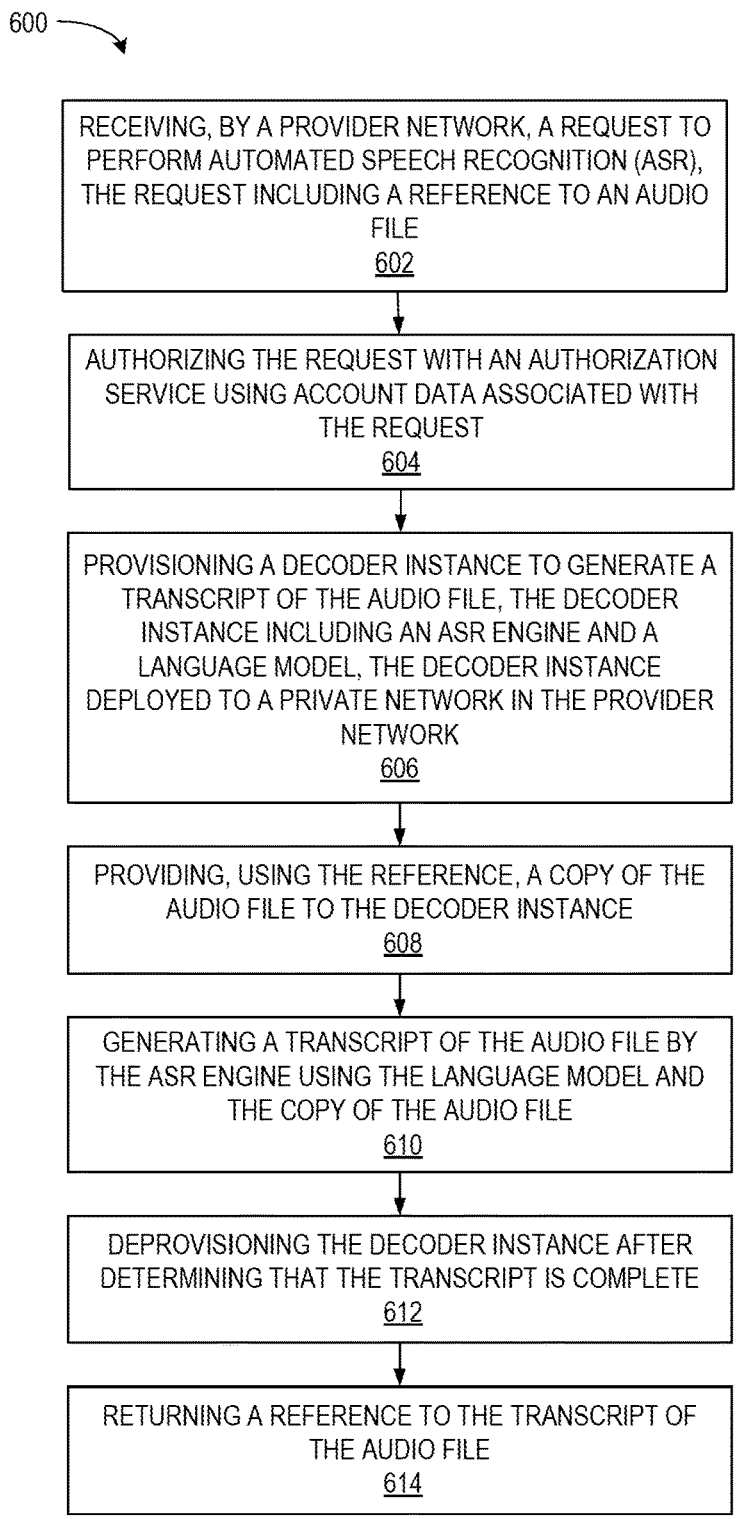
FIG. 6 is a flow diagram illustrating operations for automatic speech recognition according to some embodiments.

FIG. 6 is a flow diagram illustrating operations 600 (e.g., of a method) for automatic speech recognition according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the front-end service 114, metadata service 116, and/or control plane 118 of the other figures.

The operations 600 include, at block 602, receiving, by a provider network, a request to perform automated speech recognition (ASR), the request including a reference to an audio file. At block 604, authorizing the request with an authorization service using account data associated with the request. In some embodiments, authorizing the request with an authorization service using account data associated with the request can include determining that the account has been white listed, and determining that a number of pending requests for the account does not exceed a threshold.

At block 606, provisioning a decoder instance to generate a transcript of the audio file, the decoder instance including an ASR engine and a language model, the decoder instance deployed to a private network in the provider network. At block 608, providing, using the reference, a copy of the audio file to the decoder instance. At block 612, generating a transcript of the audio file by the ASR engine using the language model and the copy of the audio file. At block 612, deprovisioning the decoder instance after determining the transcript is complete. At block 614, returning a reference to the transcript of the audio file.

In some embodiments, a second request can be received by the provider network to perform ASR. The second request can include a second reference to a second audio file. A second decoder instance can be provisioned to generate a transcript of the second audio file. When the transcript is determined to be complete, the second decoder instance can be deprovisioned.

Figure 7:
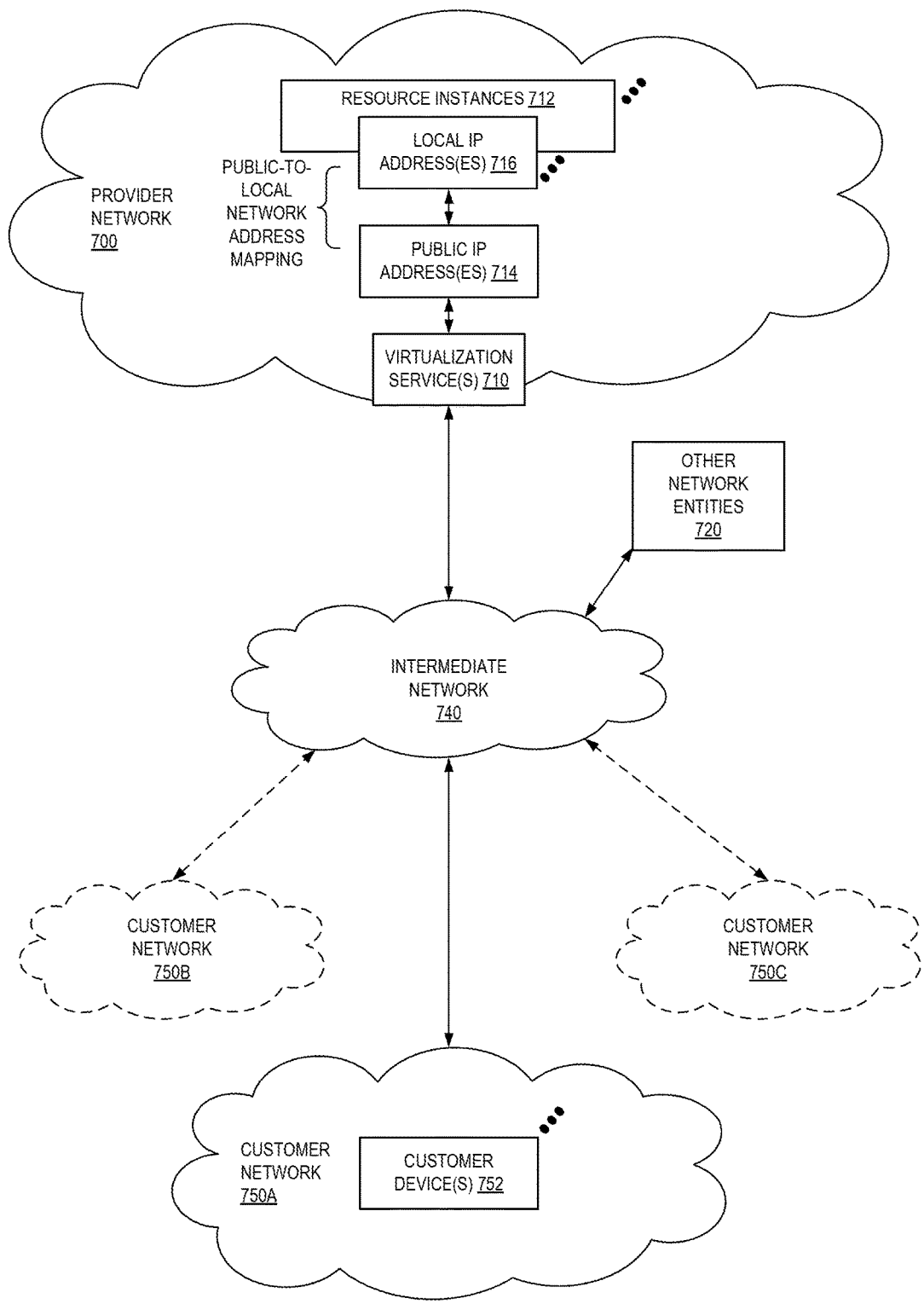
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local IP addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
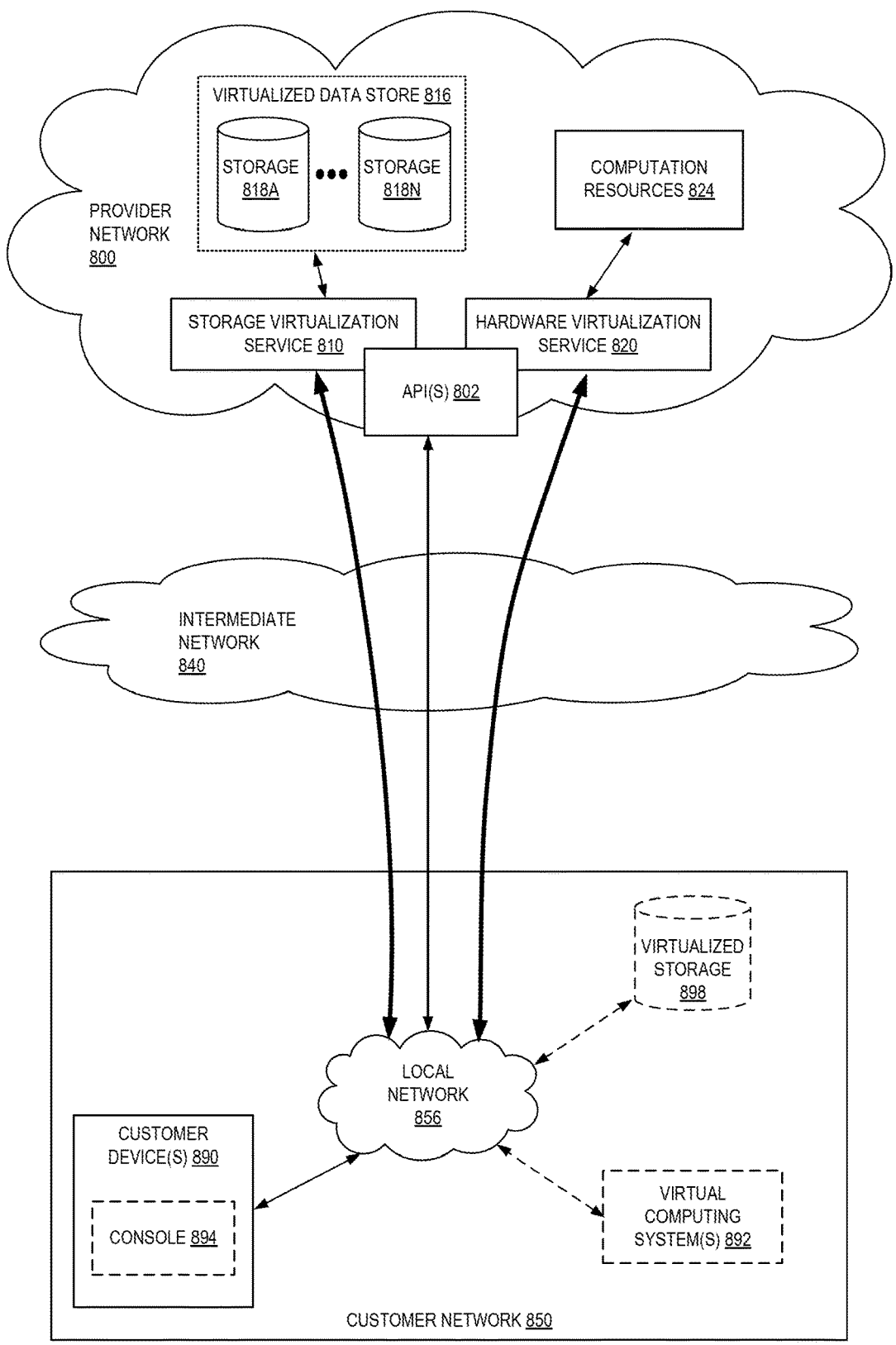
FIG. 8 is a block diagram of an example provider network that provides a storage virtualization service and a hardware virtualization service to customers according to some embodiments.

FIG. 8 is a block diagram of an example provider network that provides a storage virtualization service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage virtualization service 810, for example via one or more APIs 802, to access data from and store data to storage resources 818A-818N of a virtual data store 816 provided by the provider network 800. In some embodiments, a virtualized data store gateway (not shown) may be provided at the customer network 850 that may locally cache at least some data, for example frequently accessed or critical data, and that may communicate with virtualized data store service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes, which appear to the user as local virtualized storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
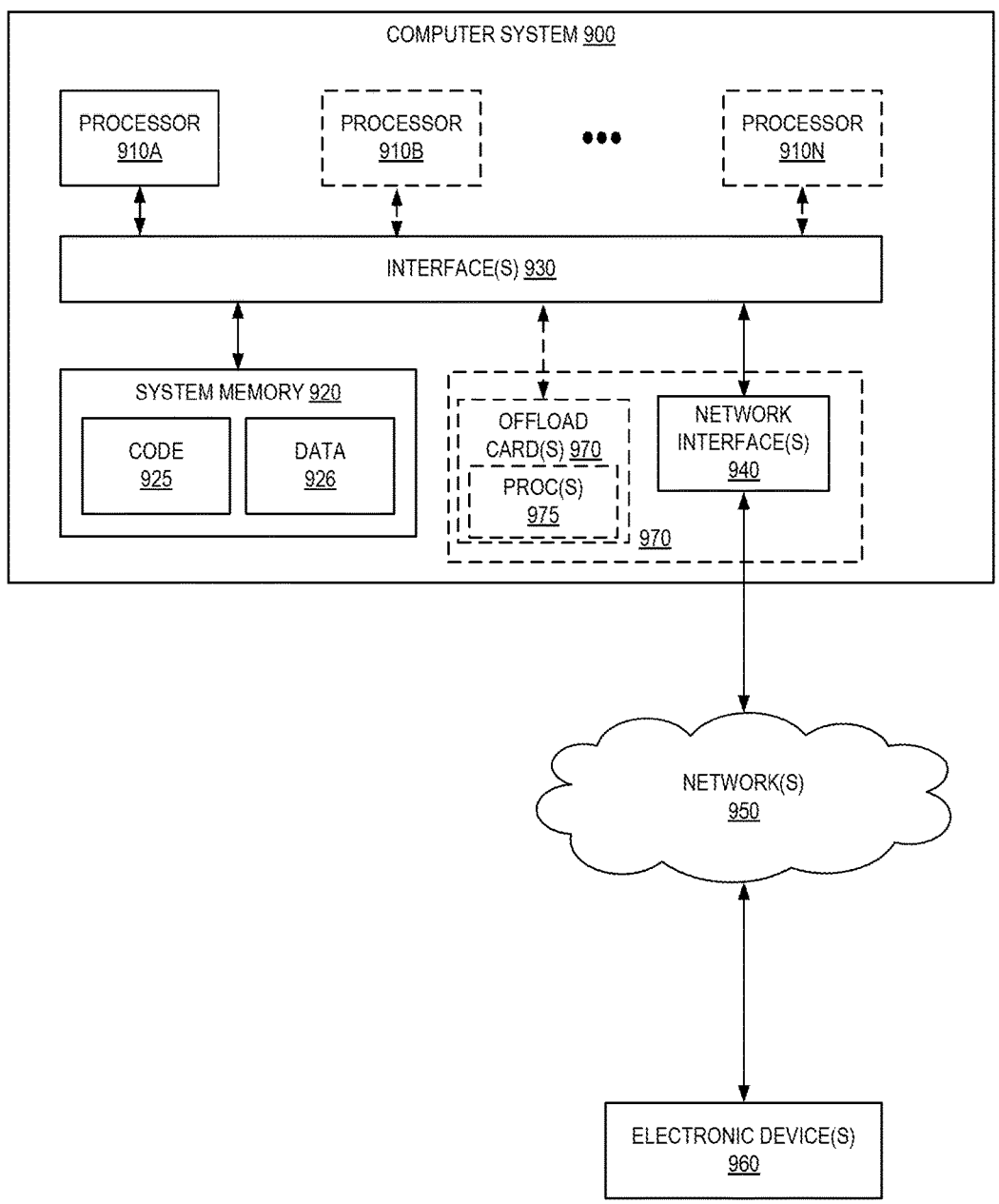
FIG. 9 is a block diagram illustrating an example computer system that may be used in some embodiments.

In some embodiments, a system that implements a portion or all of the techniques for automatic speech recognition as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a provider network, a request to perform automated speech recognition (ASR), the request including a reference to an audio file;
   authorizing the request with an authorization service using account data associated with the request;
   provisioning a decoder instance to generate a transcript of the audio file, the decoder instance including an ASR engine, an acoustic model, and a language model, the decoder instance deployed to a private network in the provider network;
   providing, using the reference, a copy of the audio file to the decoder instance;
   generating a transcript of the audio file by the ASR engine using the acoustic model, the language model, and the copy of the audio file, wherein the acoustic model is trained using previously processed data;
   monitoring an output location in the provider network to determine whether the transcript is complete;
   deprovisioning the decoder instance after determining that the transcript is complete; and
   returning a reference to the transcript of the audio file in the output location.

2. The computer-implemented method of claim 1, further comprising:
   receiving, by the provider network, a second request to perform ASR, the request including a second reference to a second audio file;
   provisioning a second decoder instance to generate a transcript of the second audio file; and
   deprovisioning the second decoder instance after determining that the transcript is complete.

3. The computer-implemented method of claim 1, wherein authorizing the request with an authorization service using account data associated with the request comprises:
   determining that the account data has been white listed; and
   determining that a number of pending requests for the account data does not exceed a threshold.

4. A computer-implemented method comprising:
   receiving, by a provider network, a request to perform automated speech recognition (ASR), the request including a reference to an audio file;
   retrieving the audio file using the reference;
   provisioning an instance deployed to a private network in the provider network to generate the transcript of the audio file;
   generating a transcript of the audio file by an ASR engine using an acoustic model, a language model, and the audio file, the ASR engine and language model implemented by the instance, wherein the acoustic model is trained using previously processed data;
   monitoring an output location in the provider network to determine whether the transcript is complete;
   deprovisioning the instance upon determining that the transcript is complete; and
   returning the transcript of the audio file.

5. The computer-implemented method of claim 4, further comprising:
   dividing the audio file into a plurality of words using the acoustic model.

6. The computer-implemented method of claim 5, wherein the acoustic model is trained using the previously processed audio data to identify inaccuracies in the acoustic model as a function of one or more of genres, acoustic properties, or customer-specific language.

7. The computer-implemented method of claim 4, further comprising:
   sending the request to a control plane, the control plane orchestrating a plurality of requests; and
   executing a workflow, by the control plane, to perform ASR on the request.

8. The computer-implemented method of claim 4, wherein the language model is one of a plurality of language models selected based on metadata received with the request.

9. The computer-implemented method of claim 4, further comprising:
authorizing the request with an authorization service to determine that a number of pending requests associated with an account associated with the request does not exceed a threshold.

10. The computer-implemented method of claim 4, wherein returning the transcript of the audio file further comprises:
uploading the transcript to a storage service provider; and
returning a reference to the transcript in the storage service provider.

11. The computer-implemented method of claim 4, wherein the instance is implemented as a container deployed in the private network.

12. A system comprising:
a provider network implemented by a first one or more electronic devices; and
an automated speech recognition (ASR) service implemented by a second one or more electronic devices in the provider network, the ASR service including instructions that upon execution cause the ASR service to:
receive a request to perform automated speech recognition (ASR), the request including a reference to an audio file;
retrieve the audio file using the reference;
provision an instance deployed to a private network in the provider network to generate the transcript of the audio file;
generate a transcript of the audio file by an ASR engine using an acoustic model, a language model, and the audio file, the ASR engine and language model implemented by the instance, wherein the acoustic model is trained using previously processed data;
monitor an output location in the provider network to determine whether the transcript is complete;
deprovision the instance upon determining that the transcript is complete; and
return the transcript of the audio file.

13. The system of claim 12, wherein the instructions, upon execution, further cause the ASR service to:
divide the audio file into a plurality of words using the acoustic model.

14. The system of claim 13, wherein wherein the acoustic model is trained using the previously processed audio data to identify inaccuracies in the acoustic model as a function of one or more of genres, acoustic properties, or customer-specific language.

15. The system of claim 12, wherein the instructions, upon execution, further cause the ASR service to:
send the request to a control plane, the control plane orchestrating a plurality of requests; and
execute a workflow, by the control plane, to perform ASR on the request.

16. The system of claim 12, wherein the language model is one of a plurality of language models selected based on metadata received with the request.

17. The system of claim 12, wherein the instructions, upon execution, further cause the ASR service to:
authorize the request with an authorization service to determine that a number of pending requests associated with an account associated with the request does not exceed a threshold.

18. The system of claim 12, wherein the instructions, to return the transcript of the audio file, when executed further causes the ASR service to:
upload the transcript to a storage service provider; and
return a reference to the transcript in the storage service provider.

* * * * *